(12) United States Patent
Deni

(10) Patent No.: US 6,195,973 B1
(45) Date of Patent: Mar. 6, 2001

(54) HAY MAKING MACHINE WITH IMPROVED SHAFT COUPLING

(75) Inventor: Franz Deni, Saulgau (DE)

(73) Assignee: Claas Saulgau GmbH, Saulgau (DE)

( * ) Notice: Subject to any disclaimer, the term of this patent is extended or adjusted under 35 U.S.C. 154(b) by 0 days.

(21) Appl. No.: 09/335,066

(22) Filed: Jun. 17, 1999

(30) Foreign Application Priority Data

Jun. 19, 1998 (DE) .............................................. 198 27 401

(51) Int. Cl.$^7$ .......................... A01D 78/00; A01D 80/00; F16D 3/26

(52) U.S. Cl. ........................ 56/370; 56/380; 56/DIG. 10; 464/106

(58) Field of Search ..................................... 464/106, 157, 464/158, 111, 149, 147, 109, 160, 113, 159; 56/370, 376, 377, 378, 380, 384, 385, 396, 10.8, 11.8, 12.6, 12.4, 381, DIG. 3, DIG. 4, DIG. 6, DIG. 10, 397; 403/364; 74/380

(56) References Cited

U.S. PATENT DOCUMENTS

| | | | |
|---|---|---|---|
| 2,281,913 | * 5/1942 | Brooks ................................... | 74/868 |
| 2,525,695 | * 10/1950 | Lombard .............................. | 464/111 |
| 4,026,123 | * 5/1977 | Durum ..................................... | 64/21 |
| 4,421,494 | * 12/1983 | Futamura et al. ..................... | 464/111 |
| 4,545,471 | * 10/1985 | Danelson et al. ...................... | 192/67 |
| 4,693,698 | * 9/1987 | Olson, II .............................. | 464/111 |
| 4,723,404 | * 2/1988 | Aron ...................................... | 56/370 |
| 5,953,894 | * 9/1999 | Aron et al. ............................ | 56/367 |

FOREIGN PATENT DOCUMENTS

| | | |
|---|---|---|
| 0 370 933 B1 | 6/1994 | (EP) . |
| 1.251.794 | 12/1960 | (FR) . |

* cited by examiner

*Primary Examiner*—Thomas B. Will
*Assistant Examiner*—Meredith C. Petravick
(74) *Attorney, Agent, or Firm*—Husch & Eppenberger, LLC; Robert E. Muir; Dutro E. Campbell

(57) ABSTRACT

A hay making machine including at least two working elements in the form of rotary rakes which are carried by intermediate frames. The intermediate frames are arranged on a support frame and supported on the ground by at least one land wheel. The intermediate frames are pivotally connected for following the contours of the ground as picked-up by the land wheels, and for pivoting about axes which extend in the direction of travel between a working position and a transportation position and vice versa. The intermediate frames also support the transmission members of the drive train, especially shafts and the power train, which are needed for conveying the drive energy to the rotary rakes rotating about vertical axes. Furthermore, the intermediate frames are connected together in the vicinity of the articulated connection between adjacent intermediate frames by coupling consisting of two coupling units that co-operate via meshing elements. By using finger-like and star-shaped coupling units, whose meshing elements have mutually perpendicular axes when the coupling is closed, the meshing elements of the one coupling unit are arranged in the interstices of the other coupling unit, resulting in the possibility of axial displacement of at least one of the coupling units. Furthermore, it follows that the spacing relative to one of the coupling units when the other coupling unit is tilted can be balanced out, thereby ensuring that the conveyance of energy is always properly effected even when using short meshing elements that are better able to withstand loads.

14 Claims, 4 Drawing Sheets

HAY MAKING MACHINE WITH IMPROVED SHAFT COUPLING

BACKGROUND OF THE INVENTION

The present invention relates generally to agricultural machinery and, more particularly, to improvements to hay making machines having a plurality of working elements.

The working elements in hay making machines of this type are in the form of rotary rakes which rotate about generally vertical axes and are arranged on mutually articulated intermediate frames. These frames can be pivoted relative to one another about axes extending in the direction of travel. The intermediate frames supporting the rotary rakes can thereby be pivoted from a working position into a transportation position and vice versa. Moreover, the working elements are supported by means of land wheels. Each working element, independently of the other working elements, can follow any unevenness in the ground being traversed by its respective wheel.

A shaft-coupling consisting of relatively pivotal coupling units is known from French patent specification FR 1 251 794. One coupling unit comprises finger-like meshing elements arranged horizontally around a circle, the interstices of the fingers being occupied by radially outwardly extending meshing elements on the other coupling unit. In this arrangement, the axes of the meshing elements are mutually perpendicular. Each of the coupling units is rigidly attached to a respective end of the shafts that are connected by means of this coupling arrangement. In the opening direction of the coupling, constructional constraints limit the angle through which such a coupling can pivot, however it may be considerably greater than 180°. By contrast, the movement in the closing direction of the coupling ceases when the flanges supporting the meshing elements of the two coupling units rest upon one another. Thus, if used in a hay making machine of the type described above, this coupling arrangement would be unable to produce a so-called negative pivotal angle, as is required when a land wheel sinks into a depression in the ground. This deficiency is overcome in European patent specification EP 370 933 by providing each of the coupling units with very long finger-like meshing elements that are disposed around respective circles whereby the axes of the finger-like meshing elements of the two coupling units will extend in parallel with one another when the coupling is closed. A coupling constructed in this manner is capable of providing negative pivotal angles when there are depressions in the ground. However, the finger-like meshing elements in the two coupling units are subjected to very high loads because they can only make contact at their front ends if a collision with the respective flange of the other coupling unit is to be avoided. Highly stressed zones, which could lead to bending or even breakage of the finger-like meshing elements, may be formed at the opposite ends thereof where they merge into their respective coupling flanges. To avoid such damage including, hardening of the finger-like meshing elements, EP 370 933 proposes to make the cross-section of the finger-like meshing elements less susceptible to loads by adopting a shape that differs from the easily manufactured cylindrical one. EP 370 933 further proposes to attach the meshing elements to the flange of the respective coupling unit in a detachable manner. However, the problem of high loads on the long finger-like meshing elements is not overcome by these measures, which of course increase the cost of the coupling.

It is an object of the present invention to overcome one or more of the above described deficiencies.

Another object of the invention is to provide a simply constructed hay making machine such that a short, space-saving coupling can be arranged in the drive train between the relatively moveable working elements, thereby allowing ground-following movement of each working element and pivoting thereof from a working position into a transportation position and vice versa.

A further object is to provide an arrangement whereby the meshing elements of the coupling units forming the coupling will be subjected to very low loads and hence will suffer much lower wear-and-tear compared to the state of the art.

SUMMARY OF THE INVENTION

In accordance with the invention there is provided an agricultural machine having at least two working elements which are carried by intermediate frames arranged on a support frame and supported on the ground by at least one land wheel; means pivotally connecting said intermediate frames for tracking the contours of the ground as picked up by the land wheels, and for pivoting about axes which extend in the direction of travel between a working position and a transportation position; a drive train including transmission members supported on said intermediate frames, each transmission member having an end adjacent the pivotally connecting means; a first coupling unit at the end of one transmission member, a second coupling unit at the end of the transmission member adjacent said one transmission member, said first and second coupling units having intermeshing elements; one of said coupling units having a plurality of finger-like meshing elements whose axes extend horizontally in the direction of the transmission members, the other of said coupling units having a plurality of radially-extending meshing elements which intermesh with the finger-like meshing elements; and means mounting at least one of the coupling units for axially displacement along its transmission member and constructed and arranged so as to effect a reduction in the drive load transferred via the meshing elements when one of the coupling units is pivoted toward the ground or toward its transportation position.

The spacing relative to one of the coupling units when the other coupling unit is tilted can be balanced out by making one of the at least one of the coupling units axially displaceable and by using coupling units, which incorporate meshing elements that are disposed around a circle and that have mutually perpendicular axes when the coupling is closed. The meshing elements of the one coupling unit are arranged in the interstices of the other coupling unit. This ensures that the conveyance of energy is always properly effected even when using short meshing elements that are better able to withstand loads.

Advantageously, the meshing elements of the star-shaped coupling unit have a cylindrically shaped head, while the other coupling unit is equipped with easy-to-manufacture cylindrical meshing elements. As a result, the contact between the meshing elements is always linear. Providing the meshing elements of the star-shaped coupling unit with flat edges and the cylindrical meshing elements with corresponding seating surfaces so that the linear contact is converted into a surface contact results in a beneficial distribution of the loads and, therefore, an advantageous load-withstanding arrangement.

To ensure positive engagement of the co-operating coupling units at any angle, the axial displacement is propagated the action of a resilient element which may be implemented most simply in the form of a compression spring.

It is advantageous for the negative pivotal angle to be limited by means of a stop in order to prevent damage to the rotary rakes due to the intermediate frame, which supports any excessively pivoting rotary rakes when the land wheel sinks into particularly deep depressions in the ground.

One advantageous design for this stop involves permitting at least one of the coupling units to be axially displaced, when pivoting a coupling unit into the transportation position, such that the meshing elements opposite the pivotal axes of the two coupling units engage over a larger pivotal range. This ensures the transfer of energy and even distribution of the load over the individual meshing elements.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
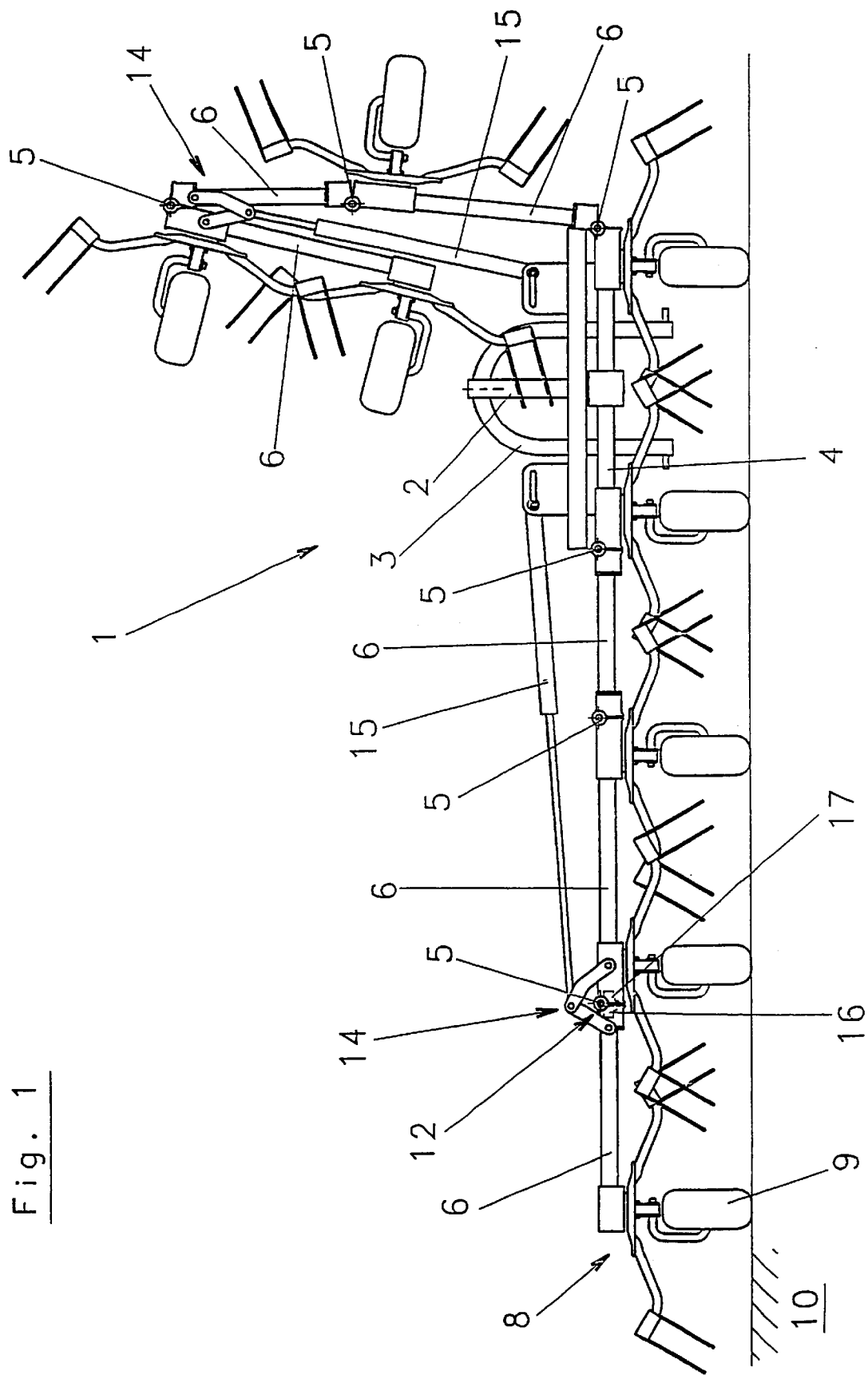
FIG. 1 is a rear view of a hay making machine showing its working position at the left hand side, and its transportation position at the right hand side.

A hay making machine 1 is illustrated in FIG. 1 in its working position at the left hand side, and its transportation position at the right hand side. The hay making machine 1 is pivotally connected to a towing vehicle (not shown) via a support frame 2 to a saddle mount 3. On the side of the support frame 2 which is remote from the saddle mount 3, the hay making machine 1 is connected to a non-pivotal mid frame 4. Intermediate frames 6, which are pivotal about axes 5 extending in the direction of travel, are provided at each end of the mid frame 4. The intermediate frames 6 are provided with known power trains 7, which are not shown. Underneath, the intermediate frames 6 support working elements in the form of rotary rakes 8 that rotate about vertical axes. Each rotary rake 8 is supported on the ground 10 by means of a land wheel 9. In the preferred embodiment illustrated, a differing number of rotary rakes 8 are associated with the intermediate frames 6, depending upon the design. Since the manner in which rotary rakes 8 are assigned to the pivotal intermediate frames 6 is not essential to the embodiment of the invention, it is merely pointed out that the invention is also applicable to other forms of assignment known from the state of the art.

Figure 2:
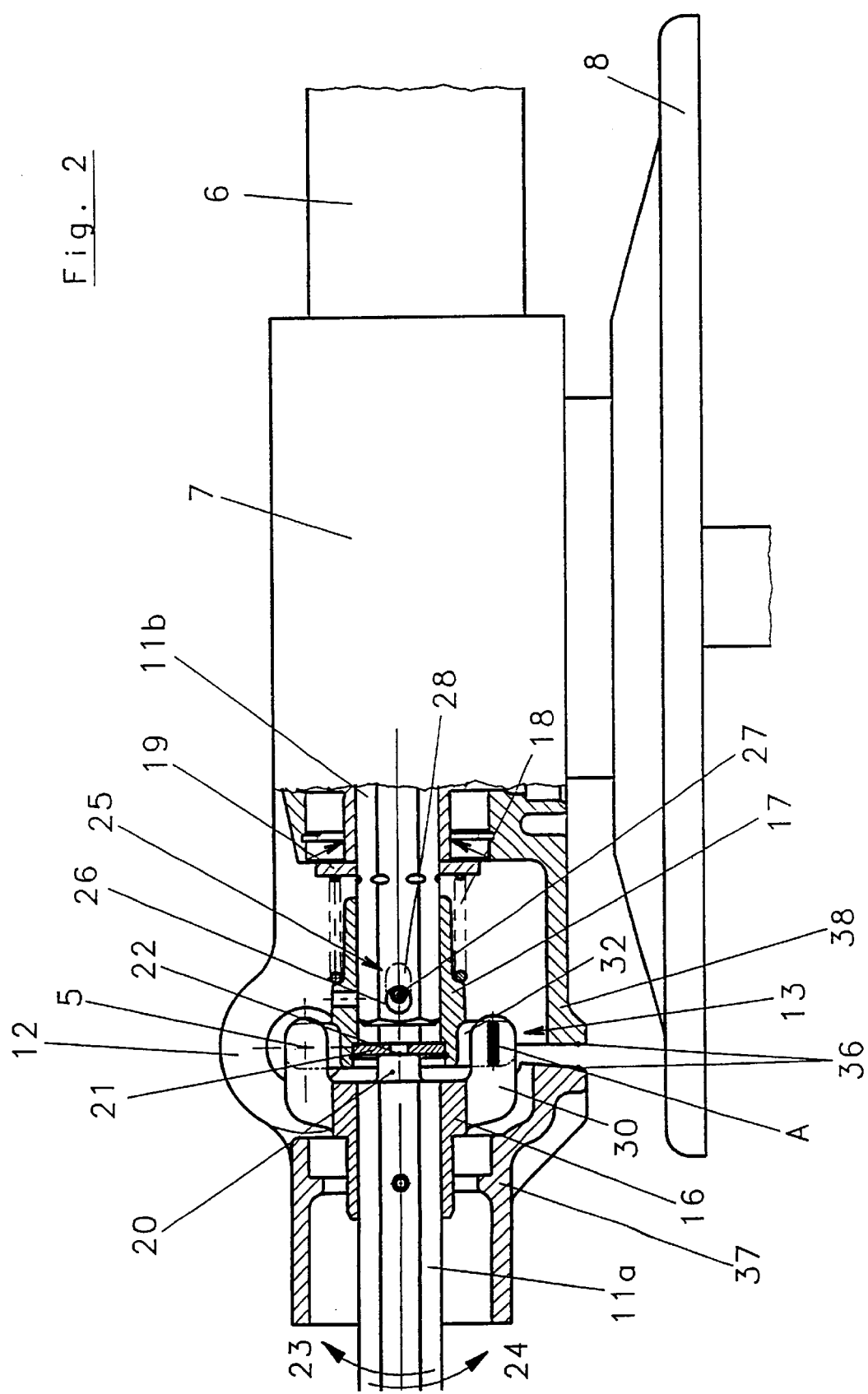
FIG. 2 is a partial sectional view of a coupling embodying the invention.

Shafts 11a, 11b (see FIG. 2) are arranged in the interior of the intermediate frames 6 for the purposes of conveying energy. These shafts are connected together by a coupling 13 in the vicinity of the articulation points 12 of the intermediate frames 6. In the embodiment being described, three intermediate frames 6 are adapted on each side of the non-pivotal mid frame 4. As shown in FIG. 1, the two respective outermost intermediate frames 6 are connected via a two-part coupler 14 to an adjusting device 15, preferably a hydraulic cylinder, which is articulated at its other end to the non-pivotal mid frame 4. This allows the rotary rakes 8 arranged on the intermediate frames 6 to be pivoted from a working position into a transportation position and vice versa. The connection between each adjusting device 15 and the mid frame 14 is designed to allow the adjusting device 15 to execute both pivotal and thrust movements. This way it is possible for the intermediate frames 6 to pivot about their respective axes 5 when the corresponding land wheels 9 of the rotary rakes 8 are traversing uneven ground. The rotary rakes 8 follow the contours of the ground and thus reduce wear or possible damage thereto by unintended contact with the ground 10. This also reduces the chance of the quality of the harvest being adversely affected by dirt thrown up from the ground 10 by the rotary rakes 8. Since the use of the exemplary coupling 13 for following ground contours and for enabling a pivoting movement into the transportation and working positions is not solely bound to the embodiment described, it may also be employed in other agricultural machines using pivotal working elements.

Referring again to FIG. 2, which shows the articulation point 12 which pivotally connects the intermediate frames 6 together. In the vicinity of the articulation point 12, adjacent ends of the shafts 11a, 11b are provided with the coupling units 16, 17 of the coupling 13 in such a way that the coupling unit 16 is fixed to the shaft 11a while the coupling unit 17 can be displaced axially along the shaft 11b. The axial displacement of the coupling unit 17 is carried out by via a resilient element in the form of a compression spring 18 which co-operates with a stop 19 located in the rear region of the coupling unit 17. The shaft 11a has a shoulder 20 on the side facing the coupling unit 17. The shoulder 20 rests on a coupling unit 17 stop member in the form of an axially secured disc 21 that is easily replaceable when worn. The shoulder 20 will cause axial displacement of the coupling unit 17 via the disc 21 in the contact zone 22 when the coupling unit 16 is pivoted in the direction of either arrow 23 or 24. Due to the central arrangement of the shoulder 20 and the disc 21, when the coupling unit 16 pivots about the axis 5 in the direction of the arrow 24, the length of the path covered by the coupling unit 17 in the axial direction will be minimal because the length of this path decreases proportionately as the spacing between the pivotal axis 5 and the contact zone 22 becomes smaller. In addition, by virtue of the centrally arranged contact zone 22, tilting is avoided when the coupling unit 17 is being axially displaced. The amount by which the coupling unit 17 can be axially displaced is limited by a stop 25 so as to avoid damage to the rotary rakes 8 as the coupling unit 16 pivots in the direction of the arrow 24. In the simplest case, the stop 25 is formed by a pin-like element 27 which is fixed in the shaft 11b and enters an opening 26 in the coupling unit 17. The end of the pin-like element 27 remote from the contact zone 22 thereby rests on the opening 26 so that axial displacement of the coupling unit 17 will only occur when the coupling unit 16 is pivoted in the direction of the arrow 24. On the other hand, if the opening 26 is in the form of a slot 28 and the pin-like element 27 is arranged within this slot such that it does not rest on an edge of the slot when the coupling 13 is closed, the coupling unit 17 will also be axially displaced along the shaft 11b when the coupling unit 16 is pivoted in the direction of the arrow 23.

Figure 3B:
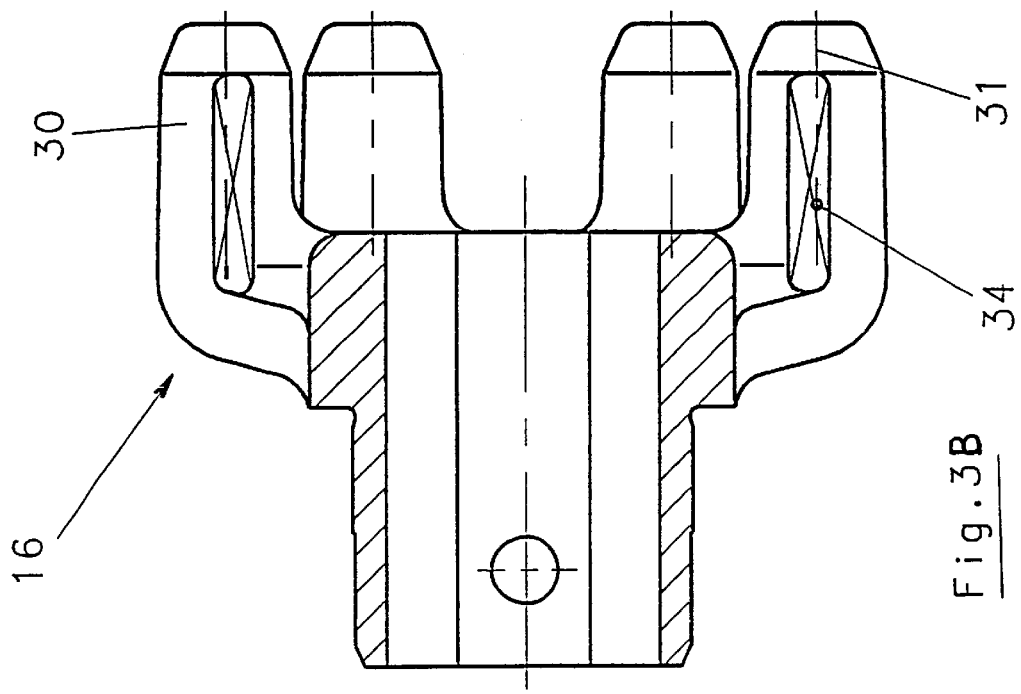
FIG. 3B is a sectional view taken along line 3B—3B of FIG. 3A.
Figure 3A:
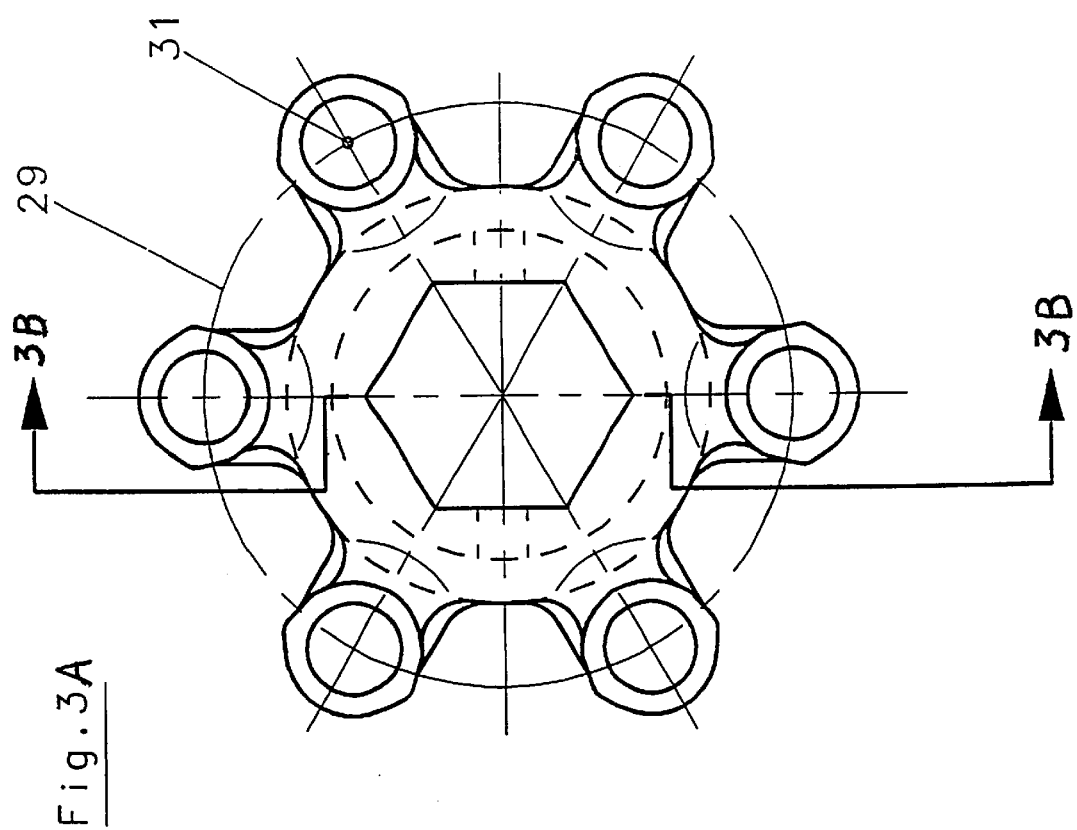
FIG. 3A is an end view of the coupling unit having finger-like meshing elements.
Figure 4A:
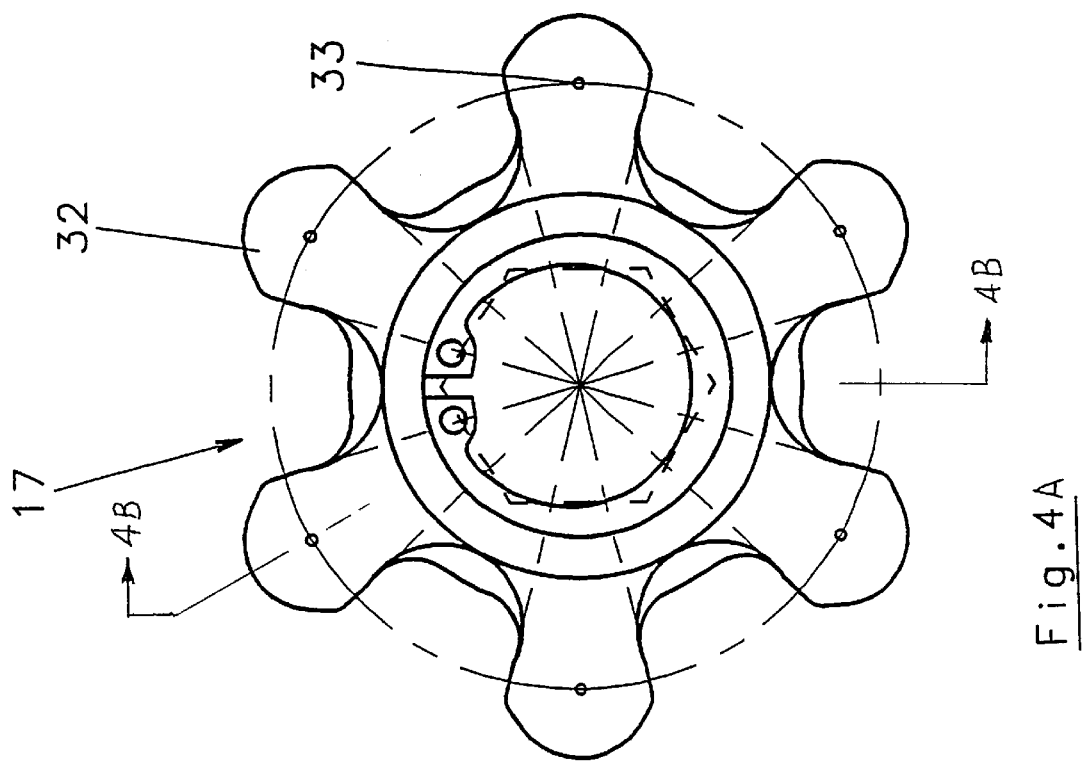
FIG. 4A is an end view of a star-like coupling unit.
Figure 4B:
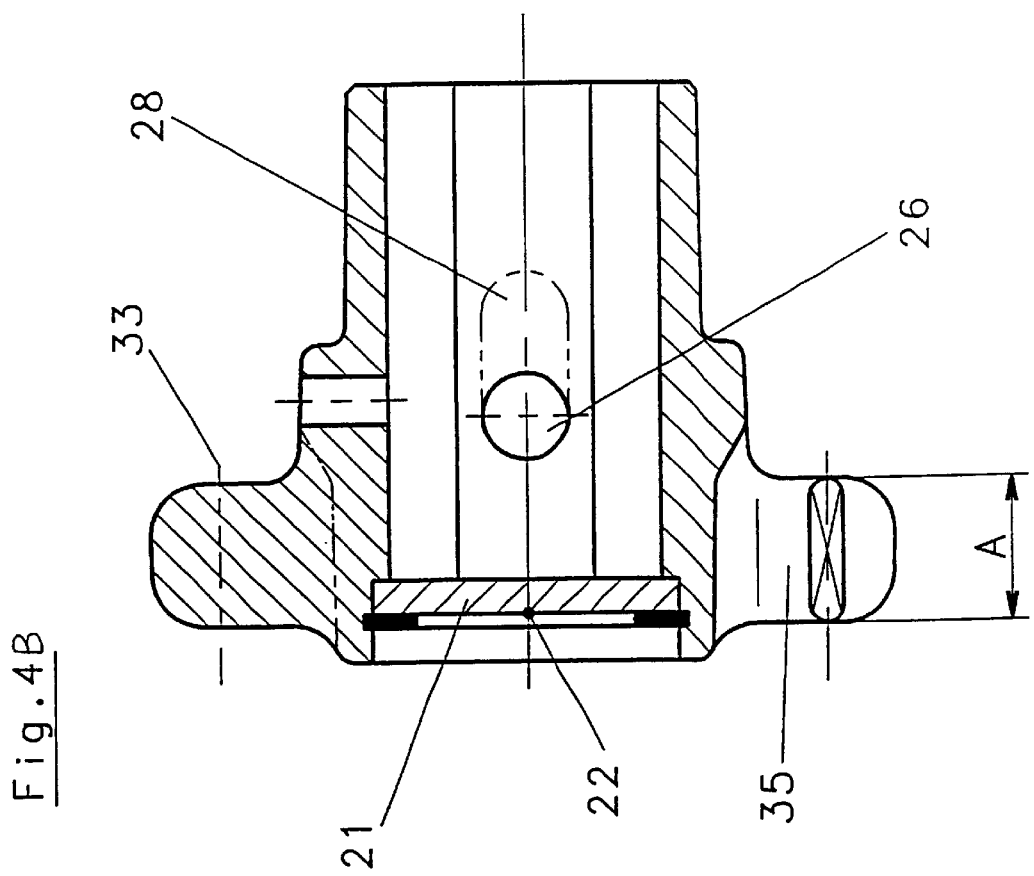
FIG. 4B is a sectional view taken generally along line 4B—4B of FIG. 4A.

As shown in FIGS. 3A and 3B, the coupling unit 16 comprises finger-like cylindrical meshing elements 30 located around an imaginary circle 29. The axes 31 of these elements extend in the direction of the shafts 11a, 11b when the coupling 13 is closed. As shown in FIGS. 4A and 4B, the coupling unit 17 comprises star-like meshing elements 32, which extend radially outwardly from a central portion of the coupling unit 17. These meshing elements 32 enter the regions between the finger-like meshing elements 30, when the coupling unit 17 and the coupling unit 16 are positioned to be functionally operative. In this manner the meshing elements 30, 32 of the two coupling units 16, 17 will intermesh and co-operate to transfer drive forces when the coupling unit 16 is pivoting slightly about the axis 5 in the direction of the arrow 23 (positive pivotal angle) or 24 (negative pivotal angle). This region is bounded by the stop 25 when the arrangement is being pivoted into the transportation position, and by the contact made by the seating surfaces 36 of claddings 37, 38, which surround the coupling units 16, 17 and are rotatable about the axis 5, when the arrangement is being pivoted toward the ground 10.

To reduce the surface pressure between the contacting meshing elements 30, 32, the outer regions of the meshing elements 32 are formed cylindrically about an axis 33, which extends parallel to the axis 31 of the meshing elements 30. In this way linear contact is made between the meshing elements 31, 32 in region A shown in FIG. 2. Advantageously, edges 35 of the meshing elements 32 of the star-like coupling unit may also be planar and the cylindrical meshing elements 30 be provided with seating surfaces 34 in the meshing zone so that the surface contact then arising will further reduce the load on the meshing elements 30, 32. To improve the contact between the seating surfaces 34 and the edges 35, the edges 35 are radially inclined in a manner such that the imaginary extension thereof will intersect at the center of rotation of the coupling unit 17 (FIG. 4).

If the coupling unit 16 is pivoted into the transportation position in correspondence with arrow 23, there will be an axial displacement of the coupling unit 17 toward the coupling unit 16, provided a stop 25 co-operating with a slot 28 is being used. This results in the meshing elements 30, 32 of the coupling units 16, 17, which are remote from the pivotal axis 5, meshing with one another over a larger pivotal range of the coupling unit 16. As a result, a more favorable distribution of the load over the meshing elements 30, 32 is achieved and more definite transfer of energy occurs when the arrangement is being pivoted toward the transportation position. On the other hand, pivoting of the coupling unit 16 in the direction of the arrow 24, which is done for the purposes of improving the manner in which the rotary rakes 8 follow any unevenness of the ground, will occur if the axial movement of the coupling unit 17 away from the coupling unit 16 is carried out against the effect of the resilient element 18. The axial displacement of the coupling unit 17 is limited by the seating surfaces 36 of the claddings 37, 38. The axial displacement described is not restricted to the coupling unit 17. The coupling unit 16 may also be arranged for axial displacement on the shaft 11a in a similar manner, whereby the coupling unit 17 is either fixed to the shaft 11b or is likewise axially displaceable thereon as described above.

Other objects, features and advantages will be apparent to those skilled in the art. While a preferred embodiment of the present invention has been illustrated and described, this has been by way of illustration and the invention should not be limited except as required by the scope of the appended claims.

I claim:

1. In an agricultural machine having at least two working elements which are carried by intermediate frames arranged on a support frame and supported on the ground by at least one land wheel; the improvement comprising:

means pivotally connecting said intermediate frames for tracking the contours of the ground as picked up by the land wheels, and for pivoting about axes which extend in the direction of travel between a working position and a transportation position;

a drive train including transmission members supported on said intermediate frames, each transmission member having an end adjacent the pivotally connecting means;

a first coupling unit at the end of one transmission member, a second coupling unit at the end of the transmission member adjacent said one transmission member, said first and second coupling units having intermeshing elements;

one of said coupling units having a plurality of finger-like meshing elements whose axes extend horizontally in the direction of the transmission members, the other of said coupling units having a plurality of radially-extending meshing elements which intermesh with the finger-like meshing elements; and means mounting at least one of the coupling units for axial displacement along its transmission member and constructed and arranged so as to effect a reduction in the drive load transferred via the meshing elements when one of the coupling units is pivoted toward the ground or toward its transportation position.

2. An agricultural machine according to claim 1, wherein the other of said coupling units is generally star-shaped.

3. An agricultural machine according to claim 2, wherein said meshing elements of the star-shaped coupling unit have edges shaped such that, when they co-operate with the cylindrically-shaped finger-like meshing elements of the coupling unit, the meshing elements of the coupling units make linear contact.

4. An agricultural machine according to claim 2, wherein said meshing elements of the star-shaped coupling unit have plane edges while the finger-like meshing elements of the coupling unit have a cylindrical section whereby the finger-like meshing elements have corresponding seating surfaces in the engagement zone of the two coupling units so that there will be surface contact between the meshing elements of the coupling elements.

5. An agricultural machine according to claim 1, wherein the edges of said meshing elements are radially inclined such that an imaginary extension thereof will intersect a point within the coupling part.

6. An agricultural machine according to claim 1, including a resilient element adjacent the axially displaceable coupling unit, and wherein each axially displaceable coupling unit is displaced against the effect of the resilient element.

7. An agricultural machine according to claim 6, wherein the resilient element is a compression spring.

8. An agricultural machine according to claim 1, wherein the transmission member includes a shaft on which one of the coupling units is axially displaceable.

9. An agricultural machine according to claim 1, including a stop adjacent each axially displaceable coupling unit for limiting the axial displacement thereof.

10. An agricultural machine according to claim 9, wherein said stop is formed by an element fixed to the transmission member of the drive train, and wherein the axially displaceable coupling unit has an opening into which said element extends.

11. An agricultural machine according to claim 9, wherein said stop is formed by an element fixed to the transmission member of the drive train, and wherein the axially displaceable coupling unit has a longitudinal slot into which said element extends.

12. An agricultural machine according to claim 11, wherein said longitudinal slot is formed such that axial displacement of the axially displaceable coupling unit is possible when the tilt angle of one of the two coupling units is positive, whereby a continuous, large overlapping region of the meshing elements of the co-operating coupling elements is obtained.

13. An agricultural machine according to claim 11, wherein said longitudinal slot is formed such that axial displacement of the axially displaceable coupling unit is possible when the tilt angle of one of the two coupling units is negative, whereby a continuous, large overlapping region of the meshing elements of the co-operating coupling elements is obtained.

14. An agricultural machine according to claim 8, including a shoulder formed on the shaft on which the axially displaceable coupling unit is not mounted and operative to cause the axial displacement of the axially displaceable coupling unit.

* * * * *